United States Patent

Schulien

[11] 3,964,805
[45] June 22, 1976

[54] DYNAMIC FLUID RESERVOIR BEARING

[75] Inventor: Howard E. Schulien, Montville, N.J.

[73] Assignee: The Bendix Corporation, Teterboro, N.J.

[22] Filed: Sept. 27, 1974

[21] Appl. No.: 509,777

[52] U.S. Cl. .................................. 308/122; 308/9; 308/103; 308/115
[51] Int. Cl.² ...................... F16C 1/24; F16C 3/02; F16C 32/06; F16C 33/66
[58] Field of Search ................. 308/9, 77, 101, 102, 308/103, 104, 109, 121, 122, 124, 115

[56] References Cited
UNITED STATES PATENTS

| | | | |
|---|---|---|---|
| 1,523,094 | 1/1925 | Winkler et al. | 308/103 |
| 2,966,381 | 12/1960 | Menzel | 308/77 |
| 3,005,666 | 10/1961 | Morser et al. | 308/122 |
| 3,399,000 | 8/1968 | Remmers | 308/121 |
| 3,799,629 | 3/1974 | Laing | 308/9 |

*Primary Examiner*—Robert J. Spar
*Assistant Examiner*—Howard Beltran
*Attorney, Agent, or Firm*—Anthony F. Cuoco; S. H. Hartz

[57] ABSTRACT

A spiral groove bearing includes a dynamic lubricant reservoir internal to the bearing for providing a continuous flow of lubricant to the active portion of the bearing. The fluid pumping effect of the spiral groove bearing in association with a fluid pump arrangement distributes the lubricant, and the reservoir has an orifice including lubricant flow control means for applying sufficient lubricant to the bearing.

6 Claims, 4 Drawing Figures

ARROWS INDICATE LUBRICANT FLOW FROM SPIRAL GROOVES

ARROWS INDICATE LUBRICANT FLOW FROM SPIRAL GROOVES

ARROWS INDICATE LUBRICANT FLOW FROM SPIRAL GROOVES AIDED BY CENTRIFUGAL FORCE

ARROWS INDICATE LUBRICANT FLOW

DYNAMIC FLUID RESERVOIR BEARING

BACKGROUND OF THE INVENTION

1. Field of the Invention

This invention relates generally to spiral groove bearings and, particularly, to spiral groove bearings including dynamic lubricant reservoir means. More particularly, this invention relates to bearings of the type described including dynamic lubricant reservoir means for providing a continuous and controlled flow of lubricant to the bearing.

2. Description of the Prior Art

Spiral groove bearings are well known in the art. Structurally they may include a spirally grooved conical shaft or thrust plate rotating in a close fitting sleeve so as to act as a viscous pump for developing a pressure profile which supports a rotating mass.

Developement studies have been made for spiral groove bearings related to the size and shape of the shafts and thrust plates, the groove depth and cross section, groove angles, lubricant constituents and properties, lubricant losses, and other considerations as well. However, there still exists several major areas of practical concern whereby the life and performance of the bearings described are limited. These areas are generally: (1) loss of lubricant through clearances; (2) deterioration of lubricant properties which tends to reduce the operating life of the bearings; (3) the effect of increased temperature on the lubricant properties. Spiral groove bearings including dynamic lubricant reservoir means and a fluid pumping arrangement according to the present invention minimize these and provide a bearing with increased life and improved performance.

SUMMARY OF THE INVENTION

This invention contemplates a spiral groove bearing including an internal dynamic lubricant reservoir for applying a controlled and continuous flow of lubricant to the active section of the bearing. The lubricant is directed through the bearing by the pumping action effected by the spiral groove arrangement, while the reservoir has orifices with restrictors calibrated to maintain a continuous flow of sufficient lubricant. The lubricant reservoir rotates at shaft speed. If the bearing is to operate under a controlled vacuum, means such as rolled felt or the like may be packed in the reservoir to allow for air evacuation without lubricant leakage in a predetermined gravitational field. Hydrostatic fluid pressure is applied by using the controlled flow of lubricant through the restricted reservoir orifices as noted, and by utilizing small fluid pumps in a predetermined pressure flow arrangement. The combination described provides a bearing having improved starting conditions and insures advantageous continuous lubricant flooding of the bearing.

One object of this invention is to provide a spiral groove bearing having a dynamic lubricant reservoir internal to the bearing for applying lubricants of various viscosities to the bearing.

Another object of this invention is to apply the lubricant in accordance with the speed of the bearing.

Another object of this invention is to provide a bearing of the type described including means whereby the lubricant is delivered to the immediate area of need.

Another object of this invention is to provide a dynamic lubricant reservoir incorporated in the spiral groove bearing described which allows the bearing to operate in a lubricant flooded condition so as to minimize the possiblility of cavitation, minimize the loss of lubricant and to replenish the lubricant to prevent changes in the chemical and physical properties thereof because of wear and load on the bearing.

Another object of this invention is to provide in a bearing of the type described a lubricant reservoir including controlled orifice means for flooding the bearing with lubricant.

Another object of this invention is to provide a spiral groove bearing as described, including in combination a dynamic lubricant reservoir, recirculation paths and fuel pumps for development of hydrostatic pressure to improve bearing starting conditions and to insure continuous lubricant flooding of the bearing area.

DESCRIPTION OF THE INVENTION

Figure 1:
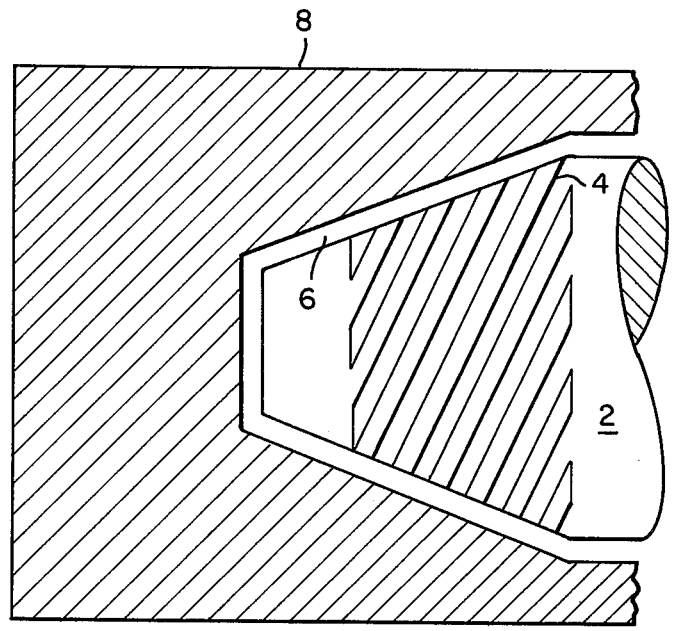
FIG. 1 is a diagrammatic representation of a typical spiral groove conical bearing with which the dynamic lubricant reservoir of the invention may be used.

With reference first to FIG. 1, a typical spiral groove bearing may include a conical shaft 2 having a plurality of spiral grooves 4 and rotating in a close fitting sleeve 6 formed in a housing 8. A device of this type acts as a viscous pump and develops a pressure profile as will be hereinafter more fully explained. This pressure profile will support a rotating mass and thus, in effect, a bearing is provided. Although a conical bearing is shown in FIG. 1 and the invention will be described relative thereto, it is to be understood that the invention applies equally as well to, for example, a journal bearing having a spiral groove thrust plate or to other type spiral groove bearings as will be understood from the description of the invention to follow.

Figure 2:
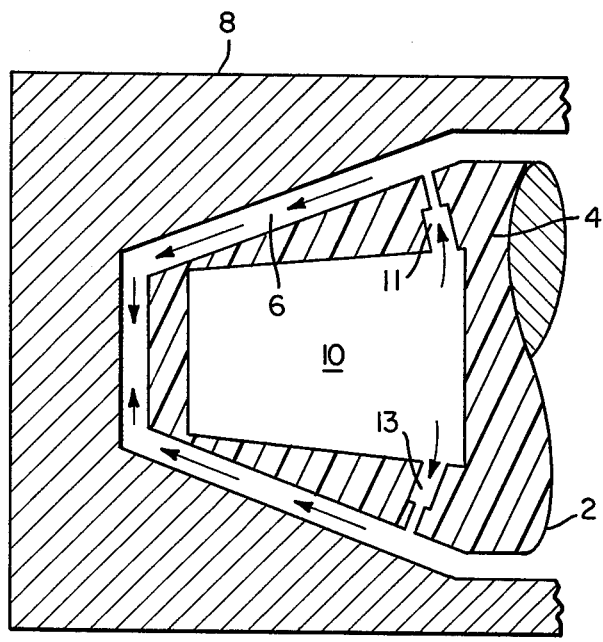
FIG. 2 is a diagrammatic representation of the conical spiral groove bearing of FIG. 1 and showing the internal dynamic lubricant reservoir according to the invention.

FIG. 2 shows the conical spiral groove bearing as shown in FIG. 1 and including a lubricant reservoir 10. Reservoir 10 is internal to conical shaft 2 as shown in FIG. 2. The arrows in FIG. 2 indicate the lubricant flow from reservoir 10 through restricted orifices 11 and 13 to sleeve 6 following the direction of spiral grooves 4 as will be hereinafter described for continuous flow of lubricant to the active section of the bearing, thus maintaining a flooded lubricant condition to provide the advantages as heretofore noted.

Figure 3:
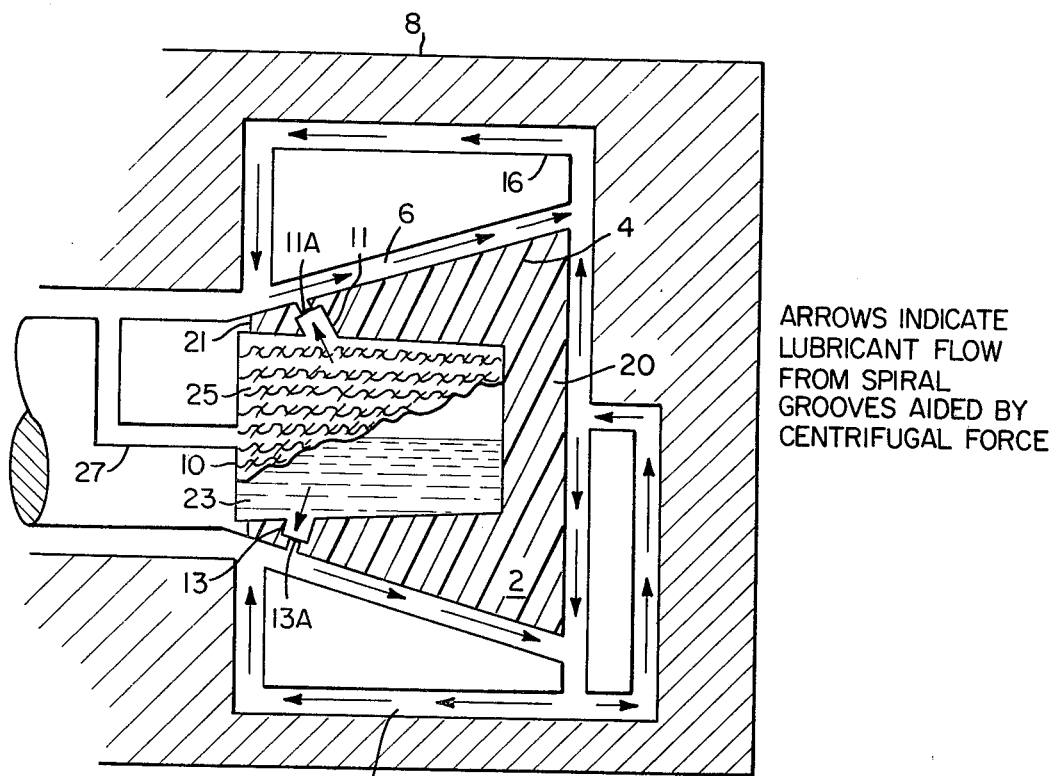
FIG. 3 is a diagrammatic representation showing the conical spiral groove bearing with the internal lubricant reservoir of FIG. 2, and further showing a fluid flow feedback path in accordance with the invention.

With reference now to FIG. 3, the lubricant flow builds up a pressure head at the large diameter 20 of shaft 2 and this pressure head forces the lubricant from sleeve 6 through channels 16 and 18 to a lower pressure zone which is at the small diameter 21 of shaft 2. Orifices 11 and 13 may include restrictors 11A and 13A which may be millipore filters or the like such as described in copending U.S. application Ser. No. 510,106 Filed by Howard E. Schulien and William H. Ficken on Sept. 27, 1974 and assigned to The Bendix Corporation assignee of the present invention, and which application is incorporated herein by reference. The restrictors are calibrated to maintain the bearing in a flooded lubricant condition.

As described in the foregoing copending U.S. application Ser. No. 510,106, dynamic lubricant reservoir 10 rotates at the speed of shaft 2. The reservoir is filled with a suitable lubricant 23 of a desired viscosity in accordance with operating speed and temperature as is well known in the art. If the device is to operate under a controlled vacuum, rolled felt or the like designated by the numeral 25 is packed within the reservoir as indicated in FIG. 3. This arrangement allows for air evacuation through a conduit and evacuation port 27 in the reservoir without lubricant leakage in a suitable gravitational field as may be desired. As further explained in said application, orifice restrictors 11A and 13A are selected for the desired operating flow and are locked into the orifices so that metered or controlled lubricant passes to the bearing support area. Thus, when the bearing is rotating the centrifugal force created develops a pressure on the lubricant within reservoir 10. The flow rate of the lubricant is proportional to this pressure and diminishes as a function of time because of the decrease in pressure with the lubricant level within the reservoir.

Figure 4:
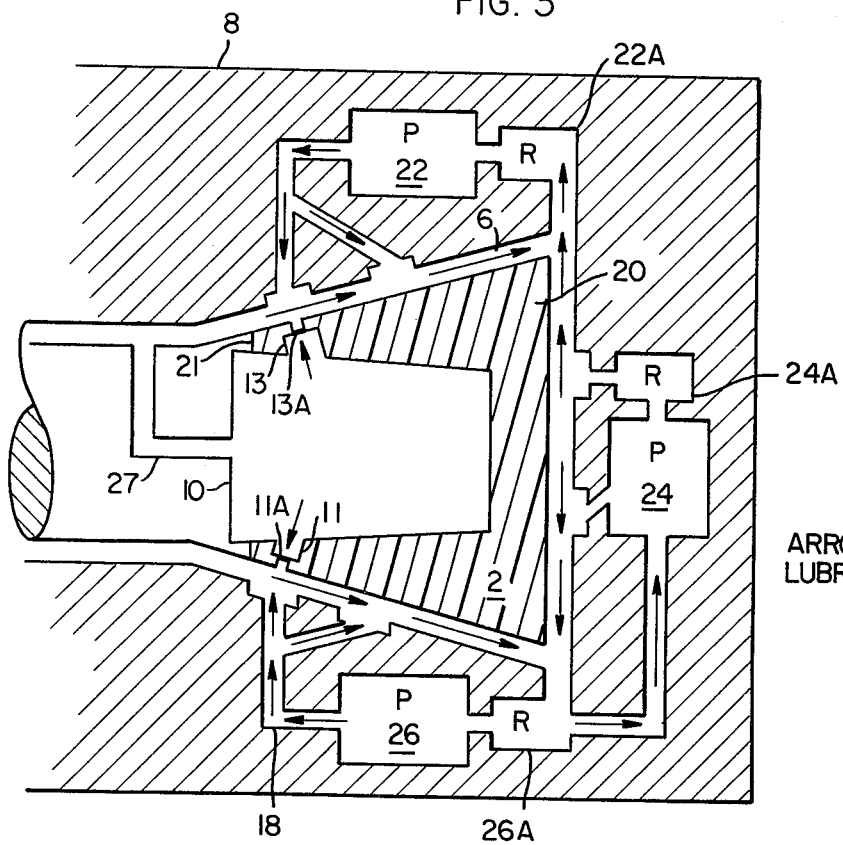
FIG. 4 is a diagrammatic representation showing the conical spiral groove bearing of FIG. 3 and further showing pumping means according to the invention.

A pressure profile is developed by utilizing not only lubricant reservoir 10 and restricted orifices 11 and 13 as heretofore noted, but by also using fluid pumps (P) 22, 24 and 26 in a pressure flow arrangement as illustrated in FIG. 4 including suitable intake reservoirs (R) 22A, 24A and 26A and lubricant flow channels to and from the pumps and reservoir as shown in FIG. 4, with lubricant flow being indicated by the arrows.

Under starting conditions pumps 22, 24 and 26 are powered for a short period of time by conventional means (not shown) prior to rotation of shaft 2 so as to develop an initial pressurized flow of lubricant from reservoir 10 throughout the spiral groove bearing. This pressure so provided reduces the load on the bearing and lowers the starting torque required for reducing the possibility of metal to metal damage which may be likely to occur.

It is well known in the art that bearing stiffness is a function of pump pressure, lubricant film thickness, lubricant flow and the geometry of the bearing, which may be designed for specific requirements. After the initial hydrostatic pressure or "lift off" has been provided, shaft 2 is energized to rotate. The initial pressure created by the action of pumps 22, 24, 26 augments the hydrodynamic carrying characteristics of the spiral groove bearing to insure a continuous volume of lubricant throughout the bearing. Lubricant flows from reservoir 10 and its restricted orifices 11 and 13 continuously to add lubricant to make up for any leakage and evaporation and to maintain the bearing in a lubricant flooded condition.

It will now be seen from the aforenoted description of the invention with reference to the drawings that the objects heretofore set forth have been met. Lubricant reservoir 10, which is internal to rotating shaft 2, provides lubricant to the bearing of a desired viscosity. Orifices 11 and 13 with calibrated restrictors 11A and 13A allow various amounts of lubricant to be added at either high or low speeds as more fully explained in the aforenoted copending application Ser. No. 510,106.

Further, lubricant is delivered to the immediate area of need. The device of the invention allows the bearing to operate in a lubricant flooded condition to solve a basic disadvantage of bearings of the type described heretofore known in the art. The lubricant reservoir recirculating paths allow for a continuous flow of lubricant as has been described. The combination of lubricant reservoir 10 recirculating paths 14, 16 and 18 and pumps 22, 24 and 26 and the associated lubricant reservoirs and flow channels provide a hydrostatic pressure for starting conditions and for insuring continuous flooding of the bearing area.

The aforegoing and other objects and advantages of the invention will appear more fully hereinafter from a consideration of the detailed description which follows, taken together with the accompanying drawings wherein several embodiments of the invention have been illustrated by way of example. It is to be expressly understood, however, that the drawings are for illustration purposes only and are not to be construed as defining the limits of the invention.

What is claimed is:

1. Lubricating apparatus for a bearing of the type including a generally conical member carrying a plurality of spiral grooves and rotating in a relatively close fitting sleeve, comprising:
    a lubricant reservoir internal to the bearing and rotating therewith, and orifices leading from the reservoir to the bearing, the reservoir including an air evacuation port and packed with a lubricant absorbant for permitting air evacuation through the port without lubricant leakage in a predetermined gravitational field;
    the lubricant flowing through the orifices and to the bearing by the pumping action effected by the spiral grooves on the rotating bearing; and
    pumping means in a predetermined pressure flow arrangement and initially operative to augment the pumping action effected by the spiral grooves for providing a bearing having improved starting conditions and for insuring continuous lubricant flooding of the bearing.

2. Apparatus as described by claim 1, including:
    restrictors arranged with the orifices for controlling the flow of lubricant therethrough.

3. Apparatus as described by claim 1, wherein:
    lubricant flow from the reservoir to the bearing follows the direction of the spiral grooves.

4. Apparatus as described by claim 1, wherein:
    the lubricant flow builds up a pressure head at the large end of the generally conical member, and which pressure head forces the lubricant from the reservoir and through the orifices and sleeve to a lower pressure zone at the small end of the conical member.

5. Apparatus as described by claim 1, wherein: the centrifugal force generated by the rotating bearing develops a pressure on the lubricant within the reservoir; and the flow rate of the lubricant is proportional to the pressure and decreases in accordance with the decrease in pressure of the lubricant level within the reservoir.

6. Apparatus as described by claim 1, including:
    a lubricant flow feedback path arranged with the reservoir and pumping means.

* * * * *